United States Patent
Le Duff

(10) Patent No.: US 12,510,514 B2
(45) Date of Patent: Dec. 30, 2025

(54) 3D IMAGE ENHANCEMENT FOR FLAW DETECTION

(71) Applicant: Evident Canada, Inc., Québec (CA)

(72) Inventor: Alain Le Duff, Quebec (CA)

(73) Assignee: Evident Canada, Inc., Québec (CA)

( * ) Notice: Subject to any disclaimer, the term of this patent is extended or adjusted under 35 U.S.C. 154(b) by 301 days.

(21) Appl. No.: 18/257,517

(22) PCT Filed: Dec. 9, 2021

(86) PCT No.: PCT/CA2021/051770
§ 371 (c)(1),
(2) Date: Jun. 14, 2023

(87) PCT Pub. No.: WO2022/126245
PCT Pub. Date: Jun. 23, 2022

(65) Prior Publication Data
US 2024/0036009 A1    Feb. 1, 2024

Related U.S. Application Data

(60) Provisional application No. 63/126,352, filed on Dec. 16, 2020.

(51) Int. Cl.
*G01N 29/06* (2006.01)
*G01N 29/14* (2006.01)
*G01N 29/26* (2006.01)

(52) U.S. Cl.
CPC .......... *G01N 29/069* (2013.01); *G01N 29/14* (2013.01); *G01N 29/262* (2013.01); *G01N 2291/2694* (2013.01)

(58) Field of Classification Search
None
See application file for complete search history.

(56) References Cited

U.S. PATENT DOCUMENTS

2006/0100512 A1* 5/2006 Lee .................. G06T 5/70
                                                        600/437
2010/0141508 A1 6/2010 Nguyen et al.
(Continued)

FOREIGN PATENT DOCUMENTS

CA      3054383 A1      8/2018
WO      WO-2022126245 A1   6/2022

OTHER PUBLICATIONS

"International Application Serial No. PCT/CA2021/051770, International Search Report mailed Feb. 28, 2022", 3 pgs.
(Continued)

*Primary Examiner* — Suman K Nath
(74) *Attorney, Agent, or Firm* — Schwegman Lundberg & Woessner, P.A.

(57) ABSTRACT

Examples of the present subject matter provide techniques for enhancing images taken from non-destructive inspection techniques, such as acoustic inspection. A source 3D data may be acquired representing an object. Rather than displaying the source 3D data, signal processing may be employed to enhance the flaws or defects in the source 3D data. A geometry template of the object may be created using the source 3D data. The source 3D data may be compared to the geometry template, and based on the comparison, an enhanced 3D image may be generated.

21 Claims, 11 Drawing Sheets

(56) References Cited

U.S. PATENT DOCUMENTS

| | | | | |
|---|---|---|---|---|
| 2013/0018265 | A1* | 1/2013 | Kim | A61B 8/145 600/443 |
| 2015/0080727 | A1 | 3/2015 | Specht et al. | |
| 2015/0193932 | A1* | 7/2015 | Hashimoto | A61B 8/466 382/132 |

OTHER PUBLICATIONS

"International Application Serial No. PCT/CA2021/051770, Written Opinion mailed Feb. 28, 2022", 5 pgs.

Ferin, Guillaume, et al., "Smart Autonomous wireless acoustic sensors for aeronautical SHM applications", IEEE International Ultrasonics Symposium Proceedings, (2015), 4 pgs.

Lamarre, Andre, "Improved Inspection of Composite Wind Turbine Blades with Accessible Advanced Ultrasonic Phased Array Technology", 15th Asia Pacific Conference for Non-Destructive Testing, [Online]. Retrieved from the Internet: <URL: http://www.ndt.net/?id=22234>, (2017), 1-8.

Marquez, Garcia Fausto, et al., "A New Approach for Fault Detection, Location and Diagnosis by Ultrasonic Testing", Energies 13, [Online]. Retrieved from the Internet: <URL: https://doi.org/10.3390/en13051192>, (2020), 1-13.

Taheri, Hossein, et al., "Nondestructive Ultrasonic Inspection of Composite Materials: A Comparative Advantage of Phased Array Ultrasonic", Applied Sciences 9, [Online]. Retrieved from the Internet: <URL: https://doi.org/10.3390/app9081628>, (2019), 16 pgs.

Tiwari, Kumar, et al., "Defect Estimation in Non-Destructive Testing of Composites by Ultrasonic Guided Waves and Image Processing", Electronics 8, [Online]. Retrieved from the Internet: <URL: https://doi.org/10.3390/electronics8030315>, (2019), 16 pgs.

Tiwari, Kumar, et al., "Hybrid Signal Processing Technique to Improve the Defect Estimation in Ultrasonic Non-Destructive Testing of Composite Structures", Sensors 17, [Online]. Retrieved from the Internet: <URL: https://doi.org/10.3390/s17122858>, (2017), 21 pgs.

Tiwari, Kumar, et al., "Refinement of Defect Detection in the Contact and Non-Contact Ultrasonic Non-Destructive Testing of Wind Turbine Blade Using Guided Waves", Procedia Structural Integrity 13, [Online]. Retrieved from the Internet: <URL: https://doi.org/10.1016/j.prostr.2018.12.320>, (2018), 1566-70.

Tiwari, Kumar, et al., "Signal Processing Methods to Improve the Signal-to-Noise Ratio (SNR) in Ultrasonic Non-Destructive Testing of Wind Turbine Blade", Procedia Structural Integrity 5, [Online]. Retrieved from the Internet: <URL: https://doi.org/10.1016/j.prostr.2017.07.036>, (2017), 1184-91.

"Canadian Application Serial No. 3,203,635, Examiners Rule 86(2) Report mailed Oct. 1, 2024", 5 pgs.

"Canadian Application Serial No. 3,203,635, Office Action mailed Aug. 1, 2025", 4 pgs.

"Canadian Application Serial No. 3,203,635, Response filed Jan. 31, 2025 to Examiners Rule 86(2) Report mailed Oct. 1, 2024", w/ claims, 13 pgs.

"European Application Serial No. 21904705.7, Extended European Search Report mailed Oct. 1, 2024", 10 pgs.

"European Application Serial No. 21904705.7, Response filed Apr. 17, 2025 to Extended European Search Report mailed Oct. 1, 2024", w/ claims, 10 pgs.

"European Application Serial No. 21904705.7, Response to Communication pursuant to Rules 161(2) and 162 EPC filed Jan. 21, 2024", 7 pgs.

Araujo, Olga, et al., "Enhancement of microCT images of steel cracks using mathematical filters", E-Journal of Nondestructive Testing, vol. 25, No. 2, (Feb. 1, 2020).

Ranjan, Kumar Ravi, et al., "Anisotropic Diffusion Based Unsharp Masking and Crispening for Denoising and Enhancement of MRI Images", 2020 International Conference on Emerging Frontiers in Electrical and Electronic Technologies (ICEFEET), IEEE, (Jul. 10, 2020), 1-6.

Sun, Linna, et al., "Comparison of Contrast Enhancement Methods for Underwater Target Sonar Images : Smart Communications: Interactive Methods and Intelligent Algorithms, Proceedings of 3rd ICWCA 2019", Advances in Wireless Communications and Applications : Smart Communications: Interactive Methods and Intelligent Algorithms, Proceedings of 3rd ICWCA 2019; Dec. 21-23, 2019, vol. 190, [Online]. Retrieved from the Internet: <URL: http://link.springer.com/10.1007/978-981-15 - 5697-5_26>, (Sep. 4, 2020), 225-232.

Westin, C., et al., "Adaptive Image Filtering", In: Handbook of Medical Image Processing and Analysis, (Jan. 1, 2009).

\* cited by examiner

3D IMAGE ENHANCEMENT FOR FLAW DETECTION

CROSS-REFERENCE TO RELATED APPLICATIONS

This application is a U.S. National Stage filing under 35 U.S.C. 371 from International Application No. PCT/CA2021/051770, filed on Dec. 9, 2021, which claims the benefit of priority to U.S. Provisional Patent Application Ser. No. 63/126,352, filed Dec. 16, 2020, the contents of which are hereby incorporated by reference in their entireties.

TECHNICAL FIELD

The present disclosure generally relates to non-destructive inspection, in particular to three-dimensional (3D) image enhancement for flaw detection using non-destructive inspection techniques.

BACKGROUND

Non-destructive inspection techniques, such as acoustic inspection, can be used to inspect components, such as, but not limited to, a composite wind turbine blade, a pressure vessel, an aircraft fuselage, a rail for railroad use, or other types of components. For instance, a wind turbine blade is subjected to considerable lift forces. To ensure the integrity of the wind turbine blade, acoustic inspection can be used to inspect different areas of interest (ROI) in the wind turbine blade, such as to provide non-destructive detection of voids or flaws that may later initiate failures such as fractures or delamination.

But objects, such as a wind turbine blade, can include different composite materials, making the analysis of acoustic inspection imaging or plots difficult. Therefore, flaws can be difficult to identify using generally-available acoustic inspection techniques because such flaws can be hidden in features generated, for example, by reflection or scattering associated with interfaces between different materials.

BRIEF DESCRIPTION OF THE DRAWINGS

Various ones of the appended drawings merely illustrate example implementations of the present disclosure and should not be considered as limiting its scope.

FIG. 3 illustrates an inspection arrangement, according to an example of the present subject matter.

DETAILED DESCRIPTION

Figure 1:
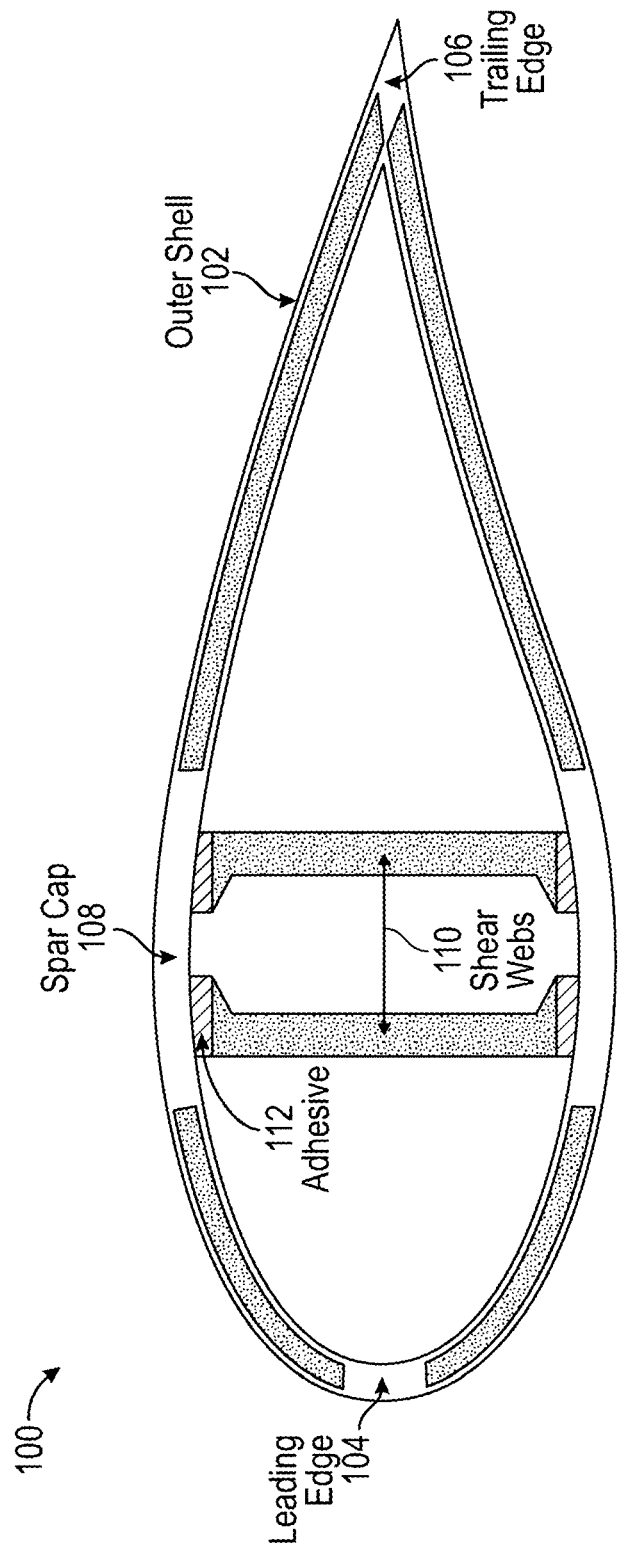
FIG. 1 illustrates an example of a cross section of a wind turbine blade.

The inventor has recognized, among other things, a need in the art for an inspection system that overcomes the challenges discussed above. Examples of the present subject matter provide techniques for enhancing images taken from non-destructive inspection techniques, such as acoustic inspection. Using acoustic inspection techniques (e.g., ultrasound), a source 3D data set may be acquired representing at least a portion of an object (e.g., an object under test). Rather than displaying raw imaging data, such as acquired using phased array ultrasonic testing or another approach, signal processing may be employed to enhance the flaws or defects in the source 3D data. A geometry template of the object may be created using the source 3D data set, for example by applying a median filter to the source 3D data. The geometry template may be generated in a manner that suppresses contributions due to flaws in the source 3D data set; hence, the geometry template may provide a geometric representation of the object absent flaws. Next, the source 3D data set may be compared to geometry template, and based on the comparison, an enhanced 3D image may be generated. The enhanced 3D image may display more detail with respect to flaws than the source 3D data set. First, the enhanced 3D image may display previously displayed flaws in more contrast and thus more clearly. Second, the enhanced 3D image may be display flaws that were previously hidden or embedded in noise in the source 3D data set (e.g., at interfaces of different materials).

This document describes a method comprising: receiving a source 3D image data set obtained using an acoustic inspection of an object; applying at least one filtering technique on the source 3D image data set to generate a template image data set of the object; comparing the source 3D image data set to the template image data set; and based on the comparing the source 3D image data set to the template image data set, generating an enhanced 3D image data set.

This document also describes a machine-storage medium embodying instructions that, when executed by a machine, cause the machine to perform operations comprising: receiving a source 3D image data set obtained using an acoustic inspection of an object; applying at least one filtering technique on the source 3D image data set to generate a template image data set of the object; comparing the source 3D image data set to the template image data set; and based on the comparing the source 3D image data set to the template image data set, generating an enhanced 3D image data set.

This document further describes a system with one or more processors of a machine. The system also includes a memory storing instructions that, when executed by the one or more processors, cause the machine to perform operations comprising: receiving a source 3D image data set obtained using an acoustic inspection of an object; applying at least one filtering technique on the source 3D image data set to generate a template image data set of the object; comparing the source 3D image data set to the template image data set;

and based on the comparing the source 3D image data set to the template image data set, generating an enhanced 3D image data set.

The 3D image enhancement techniques described herein may be used with inspecting a variety of different objects, such as wind turbine blades or other airfoil or composite structures, pipes, railroad rails, etc. Although certain examples described herein use a wind turbine blade, it should be understood that the image enhancement techniques are not limited to wind turbine blades and may be used with a variety of different objects. FIG. 1 illustrates an example of a cross section of a wind turbine blade 100. The wind turbine blade 100 may include an outer shell 102 with a leading edge 104, a trailing edge 106, and a spar cap 108, shear webs 110, and an adhesive 112.

The outer shell 102 may include the leading edge 104 and trailing edge 106, and the spar cap 108 may be provided between the leading edge 104 and trailing edge 106. The top and bottom portions of the spar cap 108 may be bonded together around the shear webs 110 using adhesive 112. The spar cap 108 may include thick Glass Fiber-Reinforced Materials (GFRM), Carbon Fiber-Reinforced Materials (CFRM), or other suitable materials for adding structural solidity. The quality of bonding between the shear webs 110 and the spar cap 108 may affect the integrity of the wind turbine blade 100.

The shear web 110 and the spar cap 108 are bonded together by a layer of adhesive 112 of varying thickness. Thus, two interfaces may be subject to inspection: 1) the interface between the spar cap 108 and the adhesive 112, and 2) the interface between the adhesive 112 and the shear web 110. For example, delamination may cause defects in these interfaces. Moreover, wind turbine blade 100 may include a complex structure such as composite materials (e.g., fiberglass), making acoustic inspection difficult. Composite materials may attenuate ultrasonic beams, making ultrasonic examination difficult, particularly interpretation of ultrasonic data.

Figure 2:
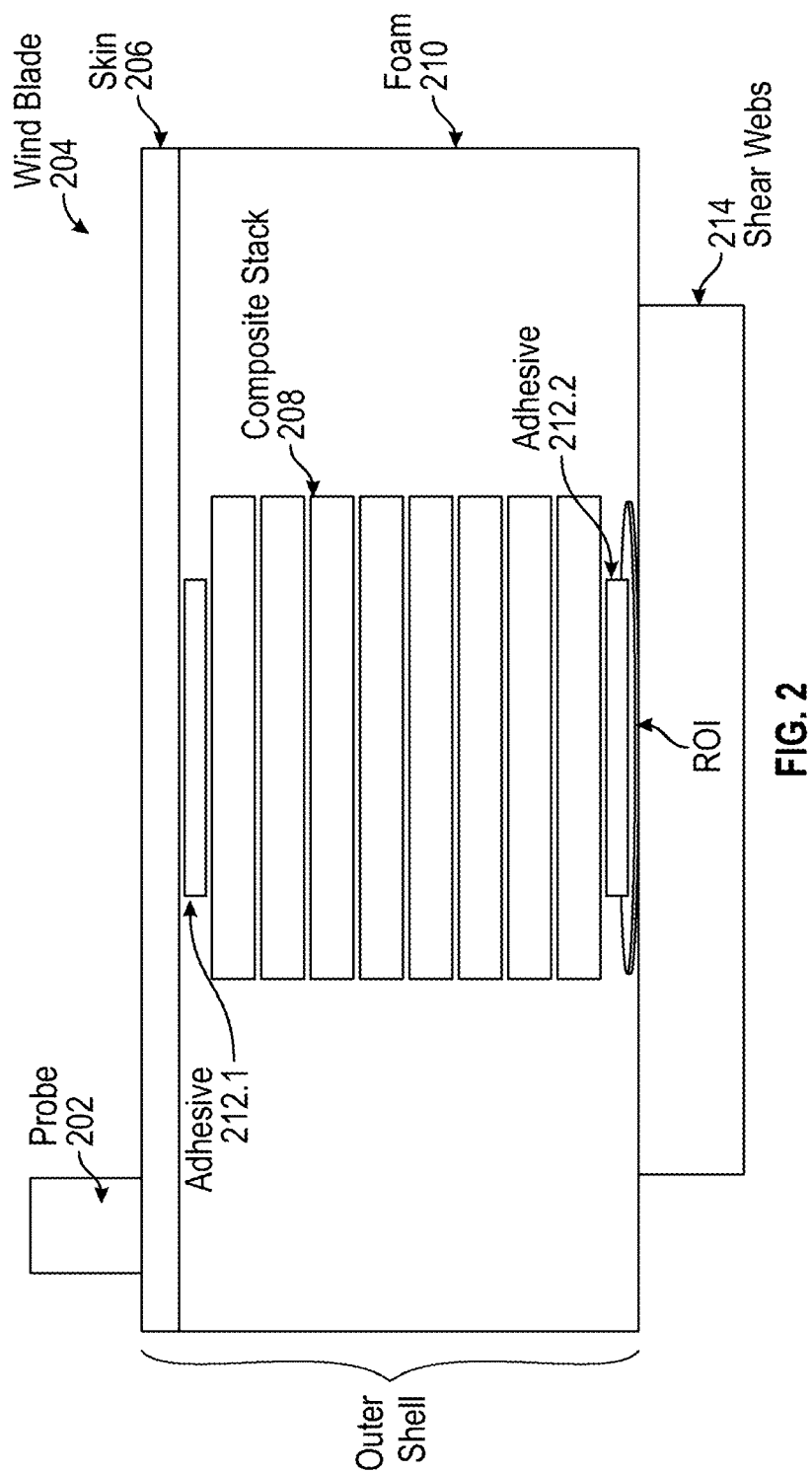
FIG. 2 illustrates an example of a schematic of a wind turbine blade.

FIG. 2 illustrates a schematic of a wind turbine blade including a region of interest (ROI) for ultrasonic inspection, according to an example of the present subject matter. In the example of FIG. 2, a probe 202 may be positioned on an outer surface of a wind turbine blade 204 (also referred to as object 204), such as upon the skin 206 along the chord line of an airfoil defining the blade 204 profile. The wind turbine blade 204 may be provided as described above with reference to FIG. 1. The wind turbine blade 204 may include a skin 206, a composite stack 208, a foam 210, adhesive 212.1, 212.2, and shear webs 214. The skin 206 may be an outermost layer of the outer shell. The composite stack 208 may be provided as stacks of composite materials (e.g., fiberglass). The outer shell of the wind turbine blade 204 may also include the foam 210 (also referred to as balsa) in certain areas (e.g., non-spar cap areas). The outer shell of the wind turbine blade 204 may be coupled to the shear web 214 with adhesive 212.2. A region of interest for inspection may be located at the bonding of the outer shell and the shear web, as described above.

Figure 3:
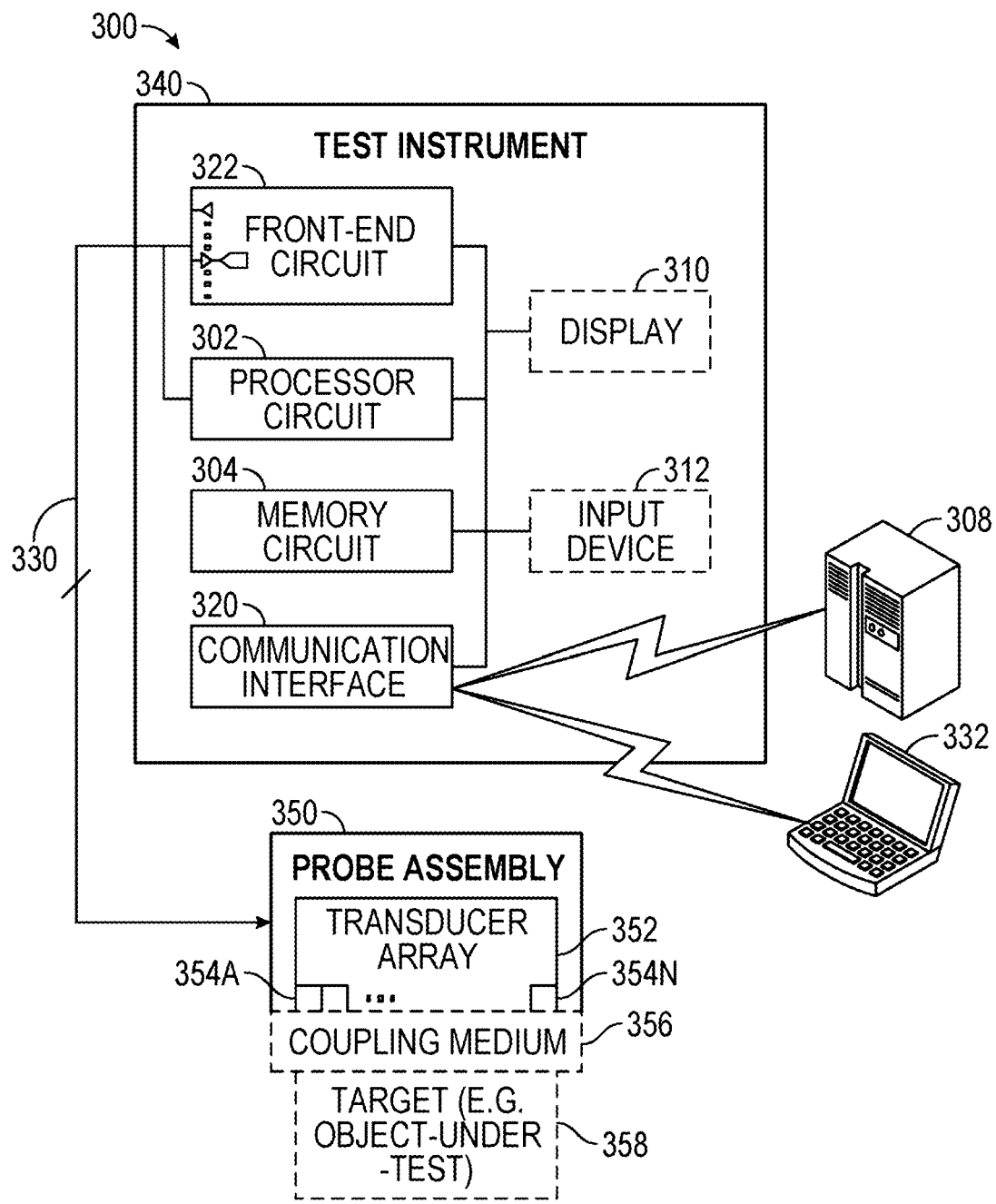
FIG. 3 illustrates an inspection system, according to an example of the present subject matter.

FIG. 3 illustrates generally an example comprising an acoustic inspection system 300, such as can be used to perform one or more techniques showed and described elsewhere herein. The inspection system may use phased array ultrasonic testing (PAUT) instruments in an example of the present subject matter. PAUT instruments (e.g., probes) may include a number of transducer elements in a single housing. The elements may be sequentially pulsed, generated a phased response. Phased-array technology may produce detailed cross-sectional pictures of internal structures at relatively fast inspection speeds. Phased array technology may use multiple ultrasonic elements and electronic time delays to create beams that can be steered, scanned, swept, and focused electronically for multiple angle inspections, as described in further detail below.

In another example, the inspection system may use total-focusing method (TFM). TFM may involve a full-matrix capture (FMC) acquisition scheme where focus can be achieved across a broad spatial region on or within a structure under test. Other techniques may also be used, such as using a mono-element transducer. Regardless of the data-capturing technique, the inspection system may obtain a 3D data set of the object to be inspected.

The inspection system 300 can include a test instrument 340, such as a hand-held or portable assembly. The test instrument 340 can be electrically coupled to a probe assembly, such as using a multi-conductor interconnect 330. The probe assembly 350 can include one or more electroacoustic transducers, such as a transducer array 352 including respective transducers 354A through 354N. The transducers array can follow a linear or curved contour or can include an array of elements extending in two axes, such as providing a matrix of transducer elements. The elements need not be square in footprint or arranged along a straight-line axis. Element size and pitch can be varied according to the inspection application.

A modular probe assembly 350 configuration can be used, such as to allow a test instrument 340 to be used with different probe assemblies 350. Generally, the transducer array 352 includes piezoelectric transducers, such as can be acoustically coupled to a target 358 (e.g., an object under test) through a coupling medium 356. The coupling medium can include a fluid or gel or a solid membrane (e.g., an elastomer or other polymer material), or a combination of fluid, gel, or solid structures. For example, an acoustic transducer assembly can include a transducer array coupled to a wedge structure comprising a rigid thermoset polymer having known acoustic propagation characteristics (for example, Rexolite® available from C-Lec Plastics Inc.), and water can be injected between the wedge and the structure under test as a coupling medium 356 during testing.

The test instrument 340 can include digital and analog circuitry, such as a front end-circuit 322 including one or more transmit signal chains, receive signal chains, or switching circuitry (e.g., transmit/receive switching circuitry). The transmit signal chain can include amplifier and filter circuitry, such as to provide transmit pulses for delivery through an interconnect 330 to a probe assembly 350 for insonification of the target 358, such as to image or otherwise detect a flaw 360 on or within the target 358 structure by receiving scattered or reflected acoustic energy elicited in response to the insonification.

While FIG. 3 shows a single probe assembly 350 and a single transducer array 352, other configurations can be used, such as multiple probe assemblies connected to a single test instrument 340, or multiple transducer arrays 352 used with a single or multiple probe assemblies 350 for tandem inspection. Similarly, a test protocol can be performed using coordination between multiple test instruments 340, such as in response to an overall test scheme established from a master test instrument 340, or established by another remote system such as a compute facility 308 or general purpose computing device such as a laptop 332, tablet, smart-phone, desktop computer, or the like. The test scheme may be established according to a published standard or regulatory requirement and may be performed upon initial fabrication or on a recurring basis for ongoing surveillance, as illustrative examples.

The receive signal chain of the front-end circuit 322 can include one or more filters or amplifier circuits, along with an analog-to-digital conversion facility, such as to digitize echo signals received using the probe assembly 350. Digitization can be performed coherently, such as to provide multiple channels of digitized data aligned or referenced to each other in time or phase. The front-end circuit 322 can be coupled to and controlled by one or more processor circuits, such as a processor circuit 302 included as a portion of the test instrument 340. The processor circuit can be coupled to a memory circuit, such as to execute instructions that cause the test instrument 340 to perform one or more of acoustic transmission, acoustic acquisition, processing, or storage of data relating to an acoustic inspection, or to otherwise perform techniques as shown and described herein. The test instrument 340 can be communicatively coupled to other portions of the system 300, such as using a wired or wireless communication interface 320.

For example, performance of one or more techniques as shown and described herein can be accomplished on-board the test instrument 340 or using other processing or storage facilities such as using a compute facility 308 or a general-purpose computing device such as a laptop 332, tablet, smart-phone, desktop computer, or the like. For example, processing tasks that would be undesirably slow if performed on-board the test instrument 340 or beyond the capabilities of the test instrument 340 can be performed remotely (e.g., on a separate system), such as in response to a request from the test instrument 340. Similarly, storage of imaging data or intermediate data such as A-scan matrices of time-series data can be accomplished using remote facilities communicatively coupled to the test instrument 340. The test instrument can include a display 330, such as for presentation of configuration information or results, and an input device 312 such as including one or more of a keyboard, trackball, function keys or soft keys, mouse-interface, touch-screen, stylus, or the like, for receiving operator commands, configuration information, or responses to queries.

Figure 4:
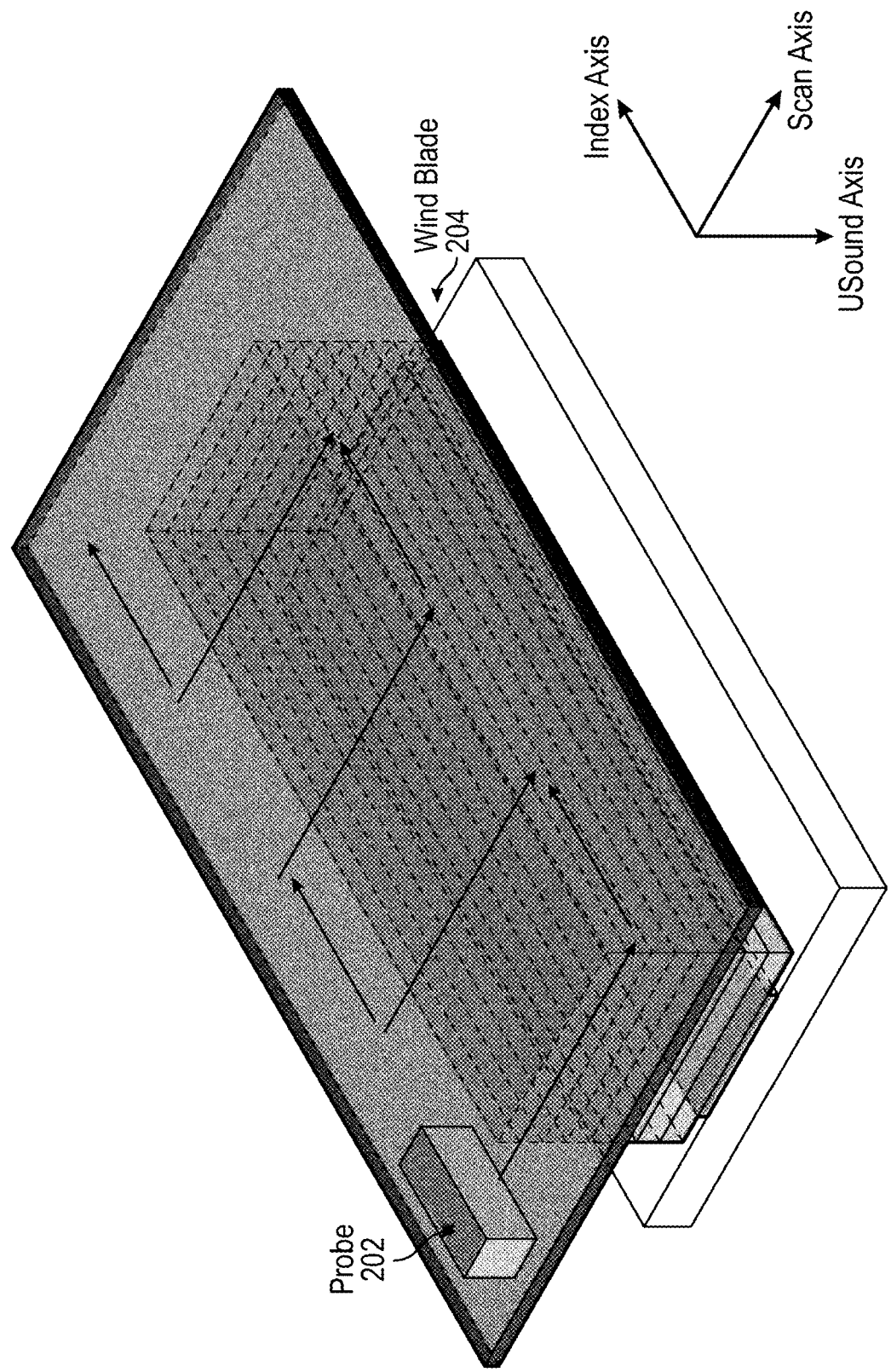
FIG. 4 illustrates an inspection procedure, according to an example of the present subject matter.

Next, techniques to obtain and enhance 3D image data set will be described. FIG. 4 shows an inspection procedure, according to an example of the present subject matter. The inspection procedure may involve a probe 202 and an object 204 to be inspected. The probe 202 may include a plurality of sensor elements. In another example, the probe 202 may be provided as a mono-element probe, which contain a single transducer element. FIG. 4 depicts inspecting a wind turbine blade, but the inspection procedures and techniques described herein can be used for inspecting other objects as well. Also, this example of an inspection procedure may use a 0° phased-array raster scan; however, other inspection techniques may be used, such as TFM, as described above. The inspection procedure of FIG. 4 may include three inspection axes: an Ultrasound (USound) axis, a Scan axis, and an Index axis. The USound axis may represent the axis of propagation of the ultrasound waves transmitted by the probe 202 into the object 204 and reflections of those ultrasound waves received by the probe 202. The Scan axis may represent the axis of the movement of the probe 202 during scan mode, e.g., when the probe is transmitting ultrasound waves and receiving reflections thereof while moving from one side of the object 204 to another side. The Index axis may represent the direction of movement of the probe 202 in between scans, e.g., from one end to another end of the object 204.

In operation, the probe 202 may be positioned at a proximal end of the object 204. The probe 202 may move from a starting position from one side of the object 204 to the other side along the scan axis during scanning. The probe 202 may transmit ultrasound waves into the object 204, which propagate into the object 204 along the USound axis. The ultrasound waves may be reflected by features in the object 204, such as flaws, backwall, etc., and those reflections may be received by the probe 202. When the probe 202 reaches the opposing side, the scanning may stop, and the probe move up a step on the index axis and may scan the object 204 moving in the opposite direction along the scan axis. When the probe 202 reaches the initial side, it may move up another step on the index axis and may scan the object 204 along the scan axis. The inspection procedure may continue these steps until the probe reaches the distal end of the object 204 and scans the relevant portion of the object 204. The movement of the probe 202 may be controlled automatically, for example by a robotic arm or other similar components.

The inspection procedure may obtain a plurality of image slices perpendicular to the index axis. The number of image slices may depend on number of elements in the probe and the number of steps or displacements in the index axis. The image slices may be combined to form a 3D image data set.

Figure 5:
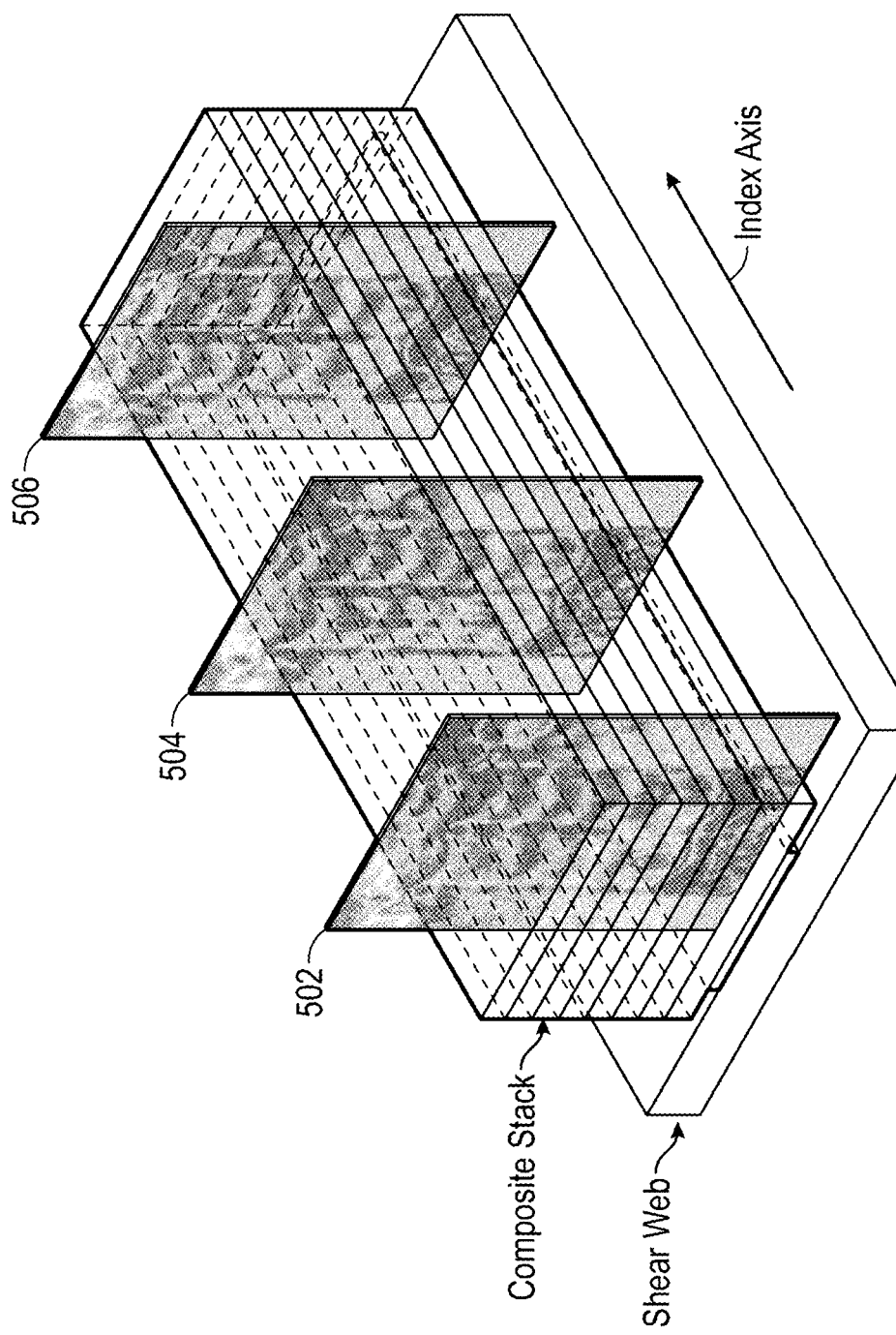
FIG. 5 illustrates a 3D view showing a plurality of image slices, according to an example of the present subject matter.

FIG. 5 illustrates a 3D view showing a plurality of image slices, according to an example of the present subject matter. The image slices are superimposed onto a picture of the object being inspected (a wind turbine blade in this example). FIG. 5 shows three different slices, but the 3D image data set may include more image slices. As shown, image slices 502-506 show embedded noise at the interface of the composite stack of the outer shell and the shear web of the wind bade, making it difficult to detect flaws or defects at that interface. Moreover, flaws in other parts of the object may also not be readily discernable.

Thus, techniques to enhance the 3D image data may be used to assist a user in discerning flaws in the object. In an example, a template image from the 3D image data set may be generated to represent an ideal image of the object. Then, the 3D image data set may be compared to the generated template image to indicate where flaws may be present in the form of recurrent geometric echoes.

Figure 6:
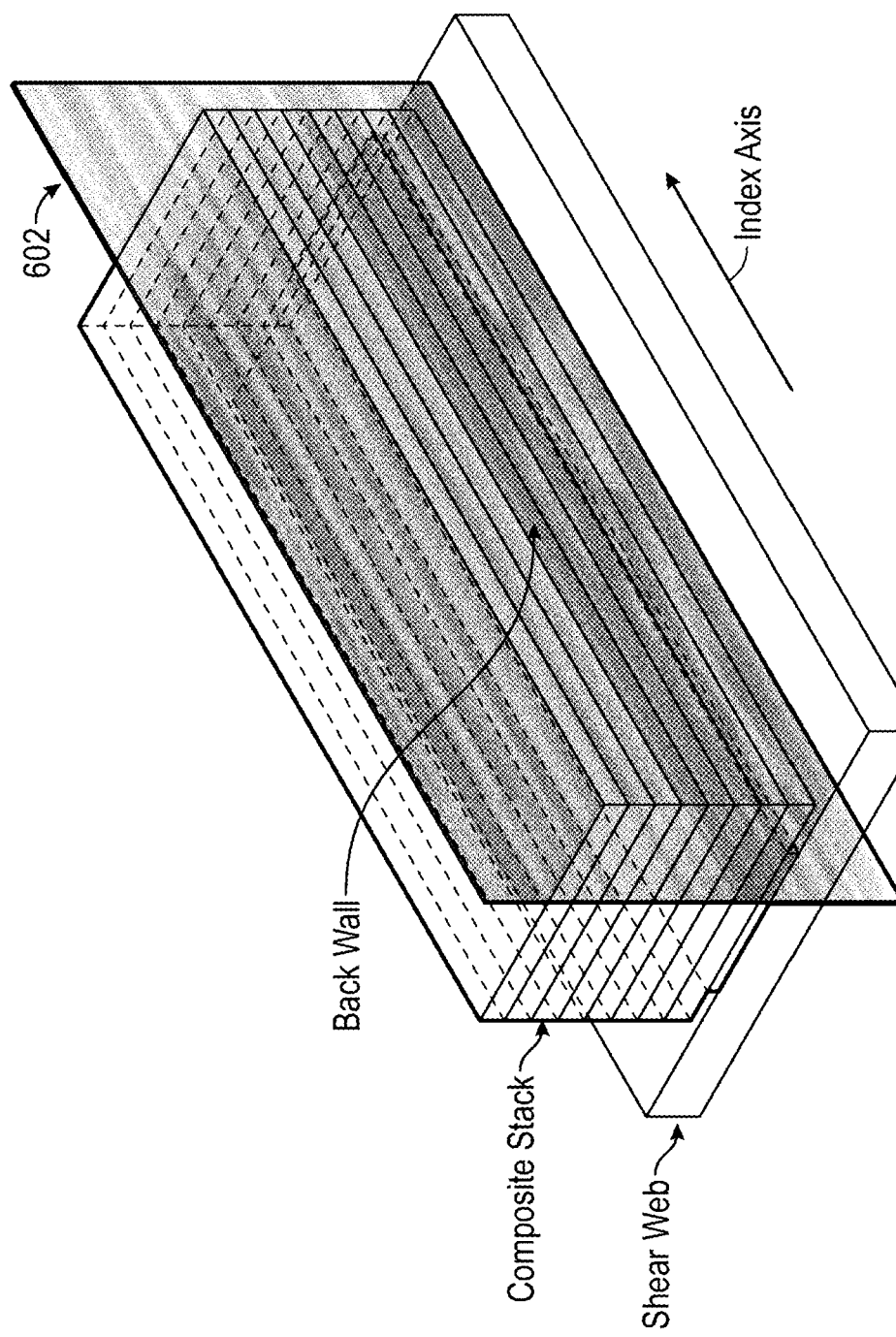
FIG. 6 illustrates a 3D view showing an image slice parallel to the index axis, according to an example of the present subject matter.

FIG. 6 illustrates a 3D view showing an image slice parallel to the index axis, according to an example of the present subject matter. Image slice 602 is superimposed onto a picture of the object being inspected (a wind turbine blade in this example). As shown, a stack configuration of the wind turbine blade has mechanical symmetry along the index axis. This symmetric relationship may be exploited to generate the template image from the obtained 3D image data set.

Here, the source image (e.g., source 3D image data set) without enhancement may be represented as:

$$I_S(x,y,z),$$

where, x, y, and z correspond to the Scan, USound, and Index axes, respectively and Is represents a voxel value, which may correspond to a detected amplitude magnitude of the reflected echo. A template may be computed by forming a new image from the source image data set where all components perpendicular to the Index axis (z axis) are identical, which may be represented as:

$$I_T(x,y,z) = \text{constant},$$

for each value of z. In an example, a median filter may be used to generate the template image. Other signal processing techniques, such as mean filtering, smoothing, averaging, or box filtering, may also be used, as illustrative examples.

With respect to median filtering, the median value for each pixel along a specified portion or an entirety of the z-axis (Index axis) of $I_S(x,y,z)$ may be generated, which may be represented as:

$$I_T(z)=M[I_S(z)],$$

for each value of x, y, where M is a median operator. The median operator may reject extreme values (outliers), which are typical of the presence of a flaw or defect, and may retain only the typical values of the blade geometry in the final result, e.g., ideal blade image.

Figure 7:
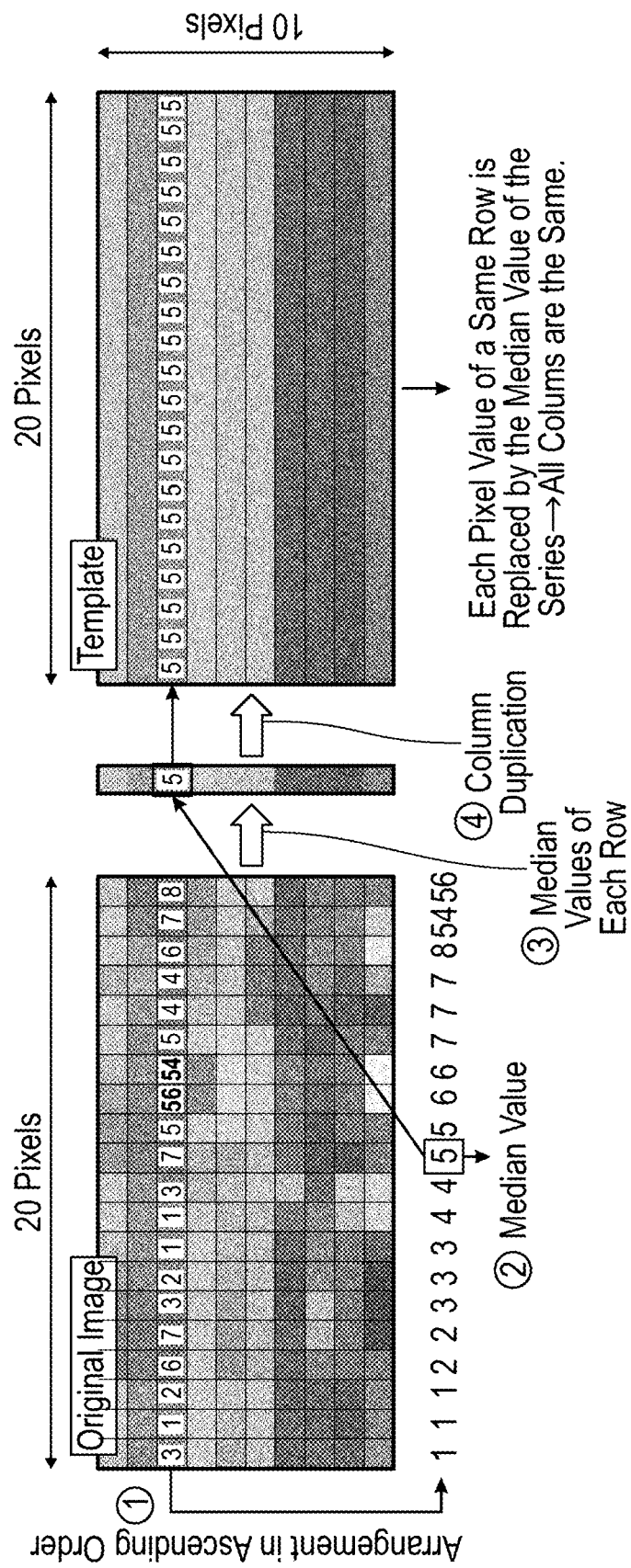
FIG. 7 illustrates a median filter, according to an example of the present subject matter.

FIG. 7 illustrates the operation of a median filter using a simplified 10×20 image. First, each pixel (or voxel) of a respective row of the input image may be arranged in an ascending order (operation 1). The input image, for example, may be the source image discussed above. Then, a median value may be determined for that row (operation 2). In FIG. 7, all values in the row are used to determine the median value, e.g., a window for determining the median value is the entire row width. In an example, a window for determining the median value may be less than the whole row width. For example, the window may be a subset of the range of values in the row and not the entire row. The window may be adjustable based on the object being inspected. The median values for each row (or adjustable window of a row) then may constitute a column in the template (operation 3). Determined columns may then be aggregated or duplicated to form a template image of the same size as the original image, such as where all columns may be identical (operation 4).

Figure 8:
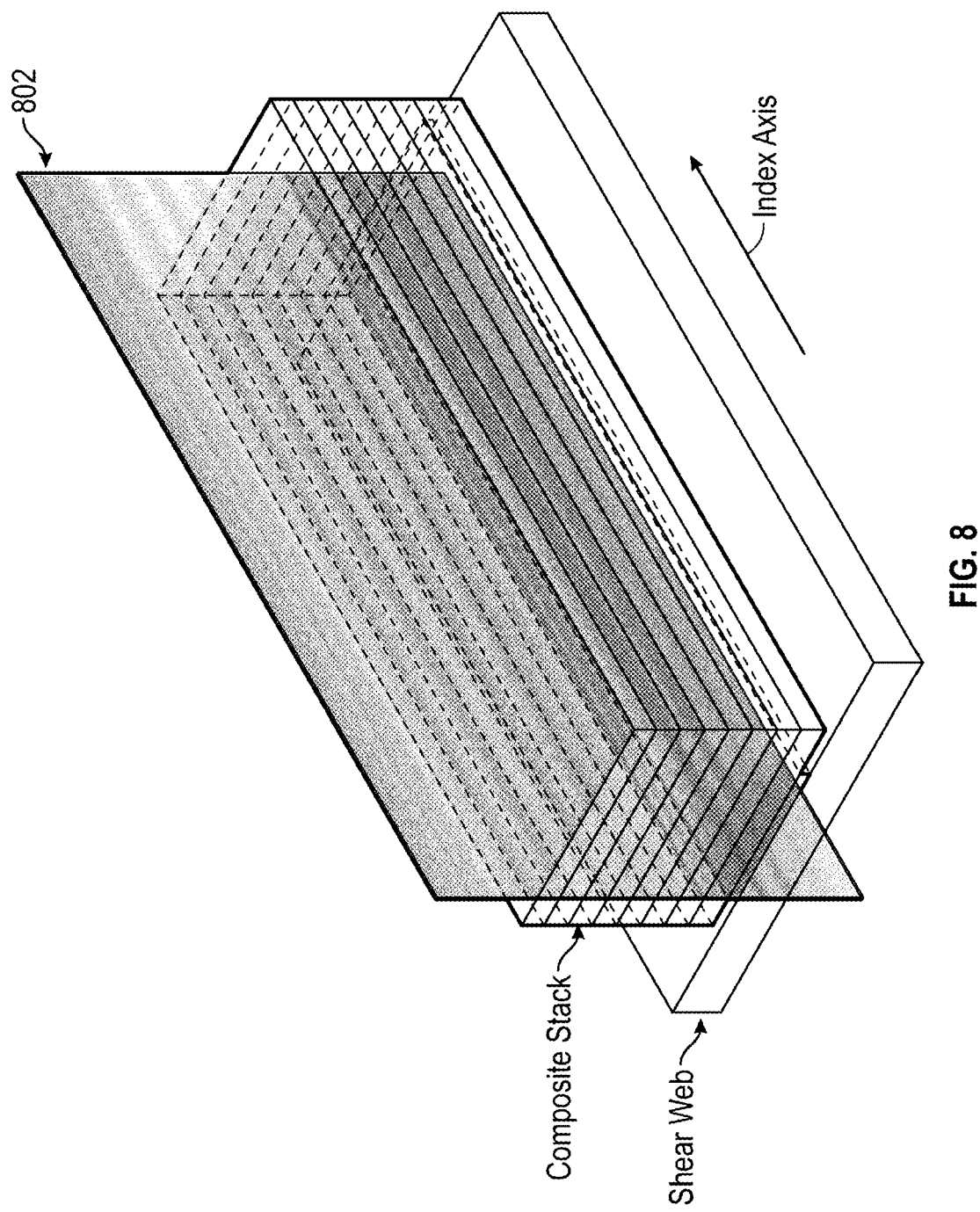
FIG. 8 illustrates a slice from a 3D template image, according to an example of the present subject matter.

FIG. 8 illustrates a slice from a 3D template image, according to an example of the present subject matter, and such as may be constructed using the technique discussed in relation to FIG. 7. In FIG. 8, for purposes of illustration, an image slice 802 is superimposed onto a representation of the object being inspected (a wind turbine blade in this example). As shown, each row in the template image slice may be homogenized based on the median value for each respective row. Consequently, each column in the template image slice may be identical, at least along a specified extent in the index axis direction.

Figure 9:
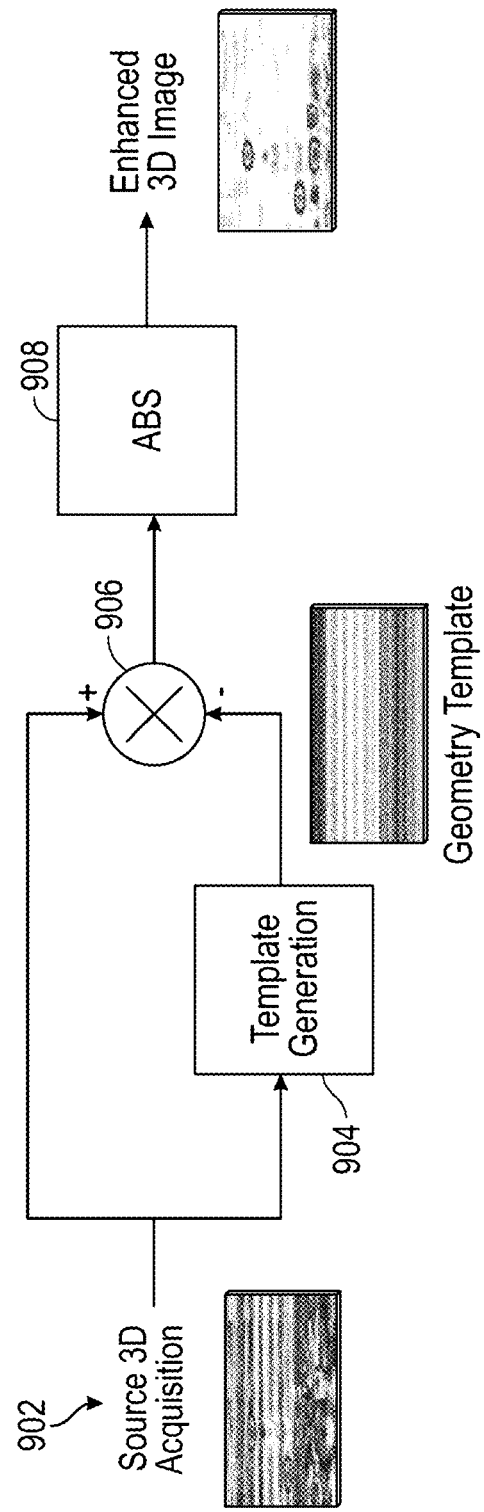
FIG. 9 illustrates an image enhancement procedure, according to an example of the present subject matter.

Next, the source 3D image data set may be enhanced using the generated template image. FIG. 9 illustrates an image enhancement procedure, according to an example of the present subject matter. At 902, a source 3D image data set may be obtained. The source 3D image data set may be retrieved from a memory or may be obtained from real-time scanning. The source 3D image data set may be obtained using a variety of acoustic inspection techniques described herein, such as phased-array ultrasound inspection.

At 904, a template image may be created using the source 3D image data set. The template image may be created by applying a filtering technique to suppress a contribution from non-uniformities along a specified axis while preserving non-uniformities along an axis normal to the specified axis, as described herein. The template image may be created by applying a median filter to the source 3D image data set or using other techniques, as described herein.

At 906, the source 3D image data set may be compared to the template image, and the source 3D image data set may be compensated by the templated image. In an example, the source 3D image data set may be compensated by subtracting the template image. In another example, the source 3D image data set may be compensated by dividing the template image. Other compensating techniques may also be used, such as using logical Boolean operators and the like.

At 908, in the event the compensated image includes negative values (e.g., compensation being performed by subtracting when the template value is greater than source image value for that voxel), the absolute value of the compensated image may be taken to generate the enhanced image with only positive values. Thus, in the example of compensating by subtracting, the enhanced image may be represented as:

$$I_C(x,y,z)=|I_S(x,y,z)-I_T(x,y,z)|$$

The above procedure was described in the context of creating the template after a complete scan of the object was completed and using the entire scan data for creating the template image. In another example, the template image can be created after one or more passes along the scan axis. Thus, multiple template images may be created for an object. In one example, one template may be created for each scan pass. In another example, a template may be created after two or more scan passes with multiple templates created for the object.

Figure 10:
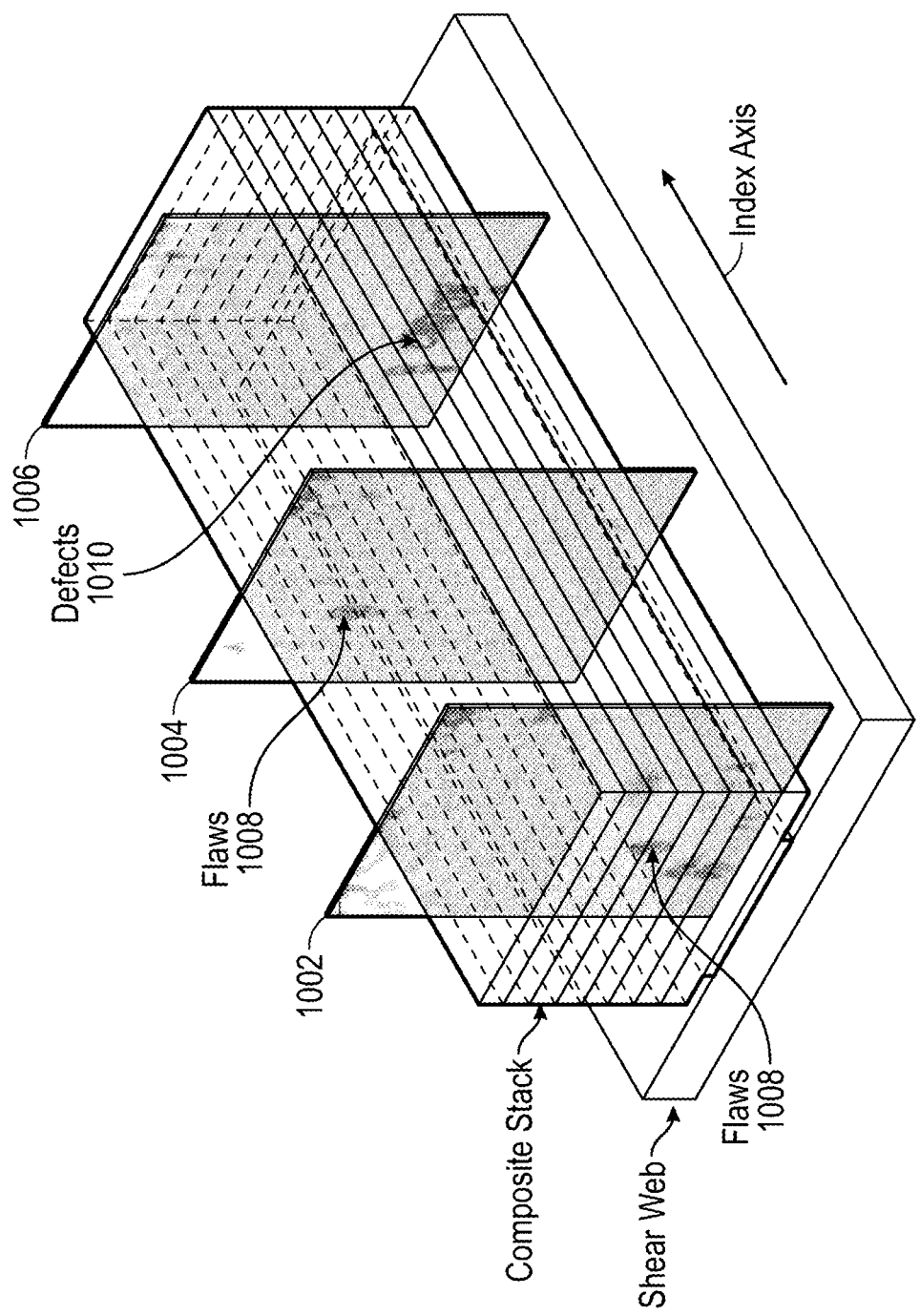
FIG. 10 illustrates a 3D view showing a plurality of enhanced image slices, according to an example of the present subject matter.

FIG. 10 illustrates a 3D view showing a plurality of enhanced image slices, according to an example of the present subject matter. Enhanced image slices 1002-1006 are superimposed onto a picture of the object being inspected (a wind turbine blade in this example). FIG. 10 illustrates the enhanced image $I_C(x,y,z)$ as compared to the source image $I_S(x,y,z)$ illustrated in FIG. 5. As shown, flaws are more readily discernable in the enhanced image as compared to the source image. First, flaws 1008 in the composite stack of the outer shell are more readily discernable because of the starker contrast in the enhanced image. These flaws 1008 may correspond to structural flaws in the outer shell such as a flat bottom hole (FBH). Second, defects 1010 in the interface between the outer shell and the shear web are revealed in the enhanced image where before they were embedded in noise in the source image. These defects 1010 may correspond to defects in the adhesion of the outer shell to the shear webs previously hidden in the non-enhanced image.

Figure 11:
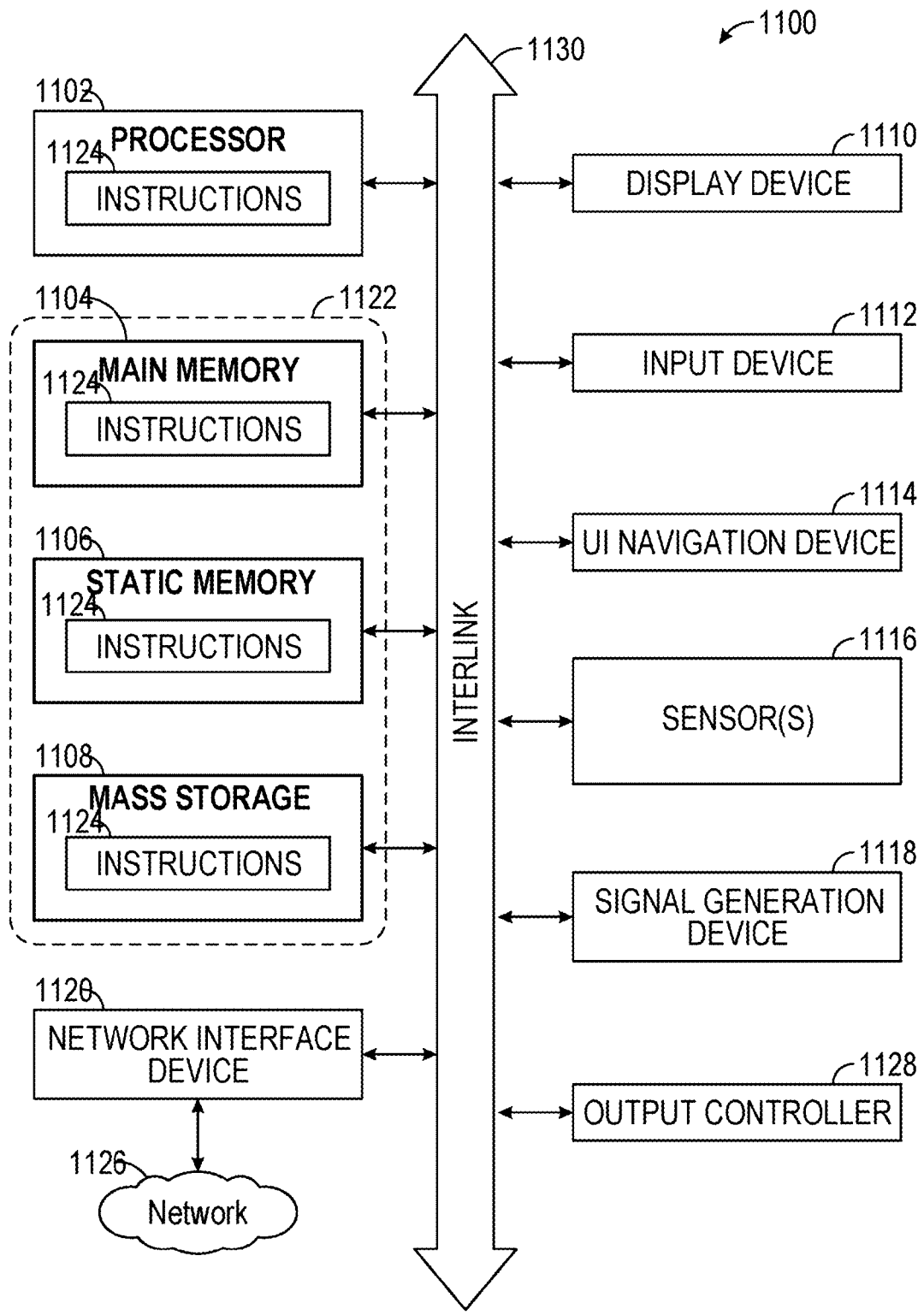
FIG. 11 illustrates a block diagram of an example comprising a machine upon which any one or more of the techniques (e.g., methodologies) discussed herein may be performed.

The techniques shown and described in this document can be performed using a portion or an entirety of an inspection system 300 as shown in FIG. 3 or otherwise using a machine 1100 as discussed below in relation to FIG. 11. FIG. 11 illustrates a block diagram of an example comprising a machine 1100 upon which any one or more of the techniques (e.g., methodologies) discussed herein may be performed. In various examples, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet device, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware comprising the circuitry may include variably connected physical components (e.g., execution units, transistors, simple circuits, etc.) including a computer readable medium physically modified (e.g., magnetically, electrically, such as via a change in physical state or transformation of another physical characteristic, etc.) to encode instructions of the specific operation. In connecting the physical components, the underlying electrical properties of a hardware constituent may be changed, for example, from an insulating characteristic to a conductive characteristic or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1108, a signal generation device 1118 (e.g., a speaker), a network interface device 1120, and one or more sensors 1116, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1122 may include a machine readable medium 1108 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the machine 1100. In an example, one or any combination of the hardware processor 1102, the main memory 1104, the static memory 1106, or the storage device 1126 may constitute machine readable media.

While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic or other phase-change or state-change memory circuits; magnetic disks, such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.22 family of standards known as Wi-Fi®, IEEE 802.26 family of standards known as WiMax®), IEEE 802.25.4 family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software.

Various Notes

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific implementations in which the invention can be practiced. These implementations are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other implementations can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed implementation. Thus, the following claims are hereby incorporated into the Detailed Description as examples or implementations, with each claim standing on its own as a separate implementation, and it is contemplated that such implementations can be combined with each other in various combinations or permutations. The scope of the invention should be determined with reference to the appended claims, along with the full scope of equivalents to which such claims are entitled.

What is claimed is:

1. A method comprising:
   receiving a source 3D image data set obtained using an acoustic inspection of an object, wherein the source 3D image data set comprises a plurality of image slices representing ultrasonic echo signals detected along an ultrasound axis representing an axis of propagation of ultrasound waves transmitted by a probe into the object, a scan axis representing an axis of movement of the probe during a scan mode, and an index axis representing a direction of movement of the probe in between scans;
   applying at least one filtering technique on the source 3D image data set to generate a template image data set of the object;
   comparing the source 3D image data set to the template image data set; and
   based on the comparing the source 3D image data set to the template image data set, generating an enhanced 3D image data set using a compensation technique.

2. The method of claim 1, wherein the applying at least one filtering technique includes suppressing a contribution from non-uniformities along a specified axis while preserving non-uniformities along an axis normal to the specified axis.

3. The method of claim 1, wherein the at least one filtering technique includes median filtering,
   wherein the source 3D image data set includes a plurality of image slices;
   the method further comprising:
   for each image slice of the plurality of image slices, median filtering at least a portion of each row so that each voxel in the portion has an identical value representing a median value of that portion.

4. The method of claim 1, wherein the source 3D image data set is obtained using a phased-array ultrasonic testing.

5. The method of claim 1, wherein comparing the source 3D image data set to the template image data set includes subtracting the template image data set from the source 3D image data set generating a difference data set.

6. The method of claim 5, further comprising:
   taking an absolute value of the difference data set to generate the enhanced 3D image data set.

7. The method of claim 1, the object includes a composite material.

8. A machine-storage medium embodying instructions that, when executed by a machine, cause the machine to perform operations comprising:
   receiving a source 3D image data set obtained using an acoustic inspection of an object, wherein the source 3D image data set comprises a plurality of image slices representing ultrasonic echo signals detected along an ultrasound axis representing an axis of propagation of ultrasound waves transmitted by a probe into the object, a scan axis representing an axis of movement of the probe during a scan mode, and an index axis representing a direction of movement of the probe in between scans;

applying at least one filtering technique on the source 3D image data set to generate a template image data set of the object;

comparing the source 3D image data set to the template image data set; and based on the comparing the source 3D image data set to the template image data set, generating an enhanced 3D image data set using a compensation technique.

9. The machine-storage medium of claim 8, wherein the applying at least one filtering technique includes suppressing a contribution from non-uniformities along a specified axis while preserving non-uniformities along an axis normal to the specified axis.

10. The machine-storage medium of claim 8, wherein the at least one filtering technique includes median filtering,
  wherein the source 3D image data set includes a plurality of image slices;
  the method further comprising:
  for each image slice of the plurality of image slices, median filtering at least a portion of each row so that each voxel in the portion has an identical value representing a median value of that portion.

11. The machine-storage medium of claim 8, wherein the source 3D image data set is obtained using a phased-array ultrasonic testing.

12. The machine-storage medium of claim 8, wherein comparing the source 3D image data set to the template image data set includes subtracting the template image data set from the source 3D image data set generating a difference data set.

13. The machine-storage medium of claim 12, further comprising:
  taking an absolute value of the difference data set to generate the enhanced 3D image data set.

14. The machine-storage medium of claim 8, the object includes a composite material.

15. A system comprising:
  one or more processors of a machine; and
  a memory storing instructions that, when executed by the one or more processors, cause the machine to perform operations comprising:
  receiving a source 3D image data set obtained using an acoustic inspection of an object, wherein the source 3D image data set comprises a plurality of image slices representing ultrasonic echo signals detected along an ultrasound axis representing an axis of propagation of ultrasound waves transmitted by a probe into the object, a scan axis representing an axis of movement of the probe during a scan mode, and an index axis representing a direction of movement of the probe in between scans;

applying at least one filtering technique on the source 3D image data set to generate a template image data set of the object;

comparing the source 3D image data set to the template image data set; and based on the comparing the source 3D image data set to the template image data set, generating an enhanced 3D image data set using a compensation technique.

16. The system of claim 15, wherein the applying at least one filtering technique includes suppressing a contribution from non-uniformities along a specified axis while preserving non-uniformities along an axis normal to the specified axis.

17. The system of claim 15, wherein the at least one filtering technique includes median filtering,
  wherein the source 3D image data set includes a plurality of image slices;
  the method further comprising:
  for each image slice of the plurality of image slices, median filtering at least a portion of each row so that each voxel in the portion has an identical value representing a median value of that portion.

18. The system of claim 15, wherein the source 3D image data set is obtained using a phased-array ultrasonic testing.

19. The system of claim 15, wherein comparing the source 3D image data set to the template image data set includes subtracting the template image data set from the source 3D image data set generating a difference data set.

20. The system of claim 19, the operations further comprising:
  taking an absolute value of the difference data set to generate the enhanced 3D image data set.

21. The system of claim 15, the object includes a composite material.

* * * * *